United States Patent

[11] 3,601,216

| [72] | Inventor | Lewis M. Mott-Smith |
| | | Houston, Tex. |
| [21] | Appl. No. | 677,279 |
| [22] | Filed | Oct. 23, 1967 |
| [45] | Patented | Aug. 24, 1971 |
| [73] | Assignee | Mandrel Industries, Inc. |
| | | Houston, Tex. |

[54] SYSTEM FOR SUPPRESSING MULTIPLE PULSE IN MARINE SEISMIC SOURCES BY INJECTION OF ADDITIONAL AIR
5 Claims, 2 Drawing Figs.

[52] U.S. Cl. .................................... 181/.5 H,
340/7
[51] Int. Cl. .................................... G01v 1/04,
G01v 1/38
[50] Field of Search ........................... 181/.5 A;
102/23; 340/7

[56] References Cited
UNITED STATES PATENTS

| 2,351,524 | 6/1944 | Lay et al. .................. | 181/.5 C |
| 2,599,245 | 6/1952 | Finn .......................... | 181/.5 C |
| 2,561,309 | 7/1951 | Gaby ......................... | 181/.5 C |
| 2,619,186 | 11/1952 | Carlisle ..................... | 181/.5 C |
| 2,877,859 | 3/1959 | Knudsen .................... | 181/.5 C |
| 3,006,279 | 10/1961 | Lawrence ................... | 181/.5 C |
| 3,292,140 | 12/1966 | Angona et al. .............. | 340/7 |
| 3,310,128 | 3/1967 | Chelminski ................. | 181/.5 C |
| 3,371,740 | 3/1968 | Loper ........................ | 340/7 |

Primary Examiner—Rodney D. Bennett, Jr.
Assistant Examiner—Daniel C. Kaufman
Attorney—Robert G. Clay ABSTRACT: Apparatus and method for suppressing the initial and subsequent contractions of an air bubble used to generate a seismic signal, wherein the preferred embodiment a source of suppressor air is located immediately adjacent to the air valve source which creates the bubble, whereby the source of suppressor air is located within the expanded bubble when it approaches its largest diameter to allow the sudden and rapid release of suppressor air into the bubble to retard the contraction of the bubble. In a second embodiment, the air valve source itself defines the source of suppressor air.

PATENTED AUG 24 1971  3,601,216
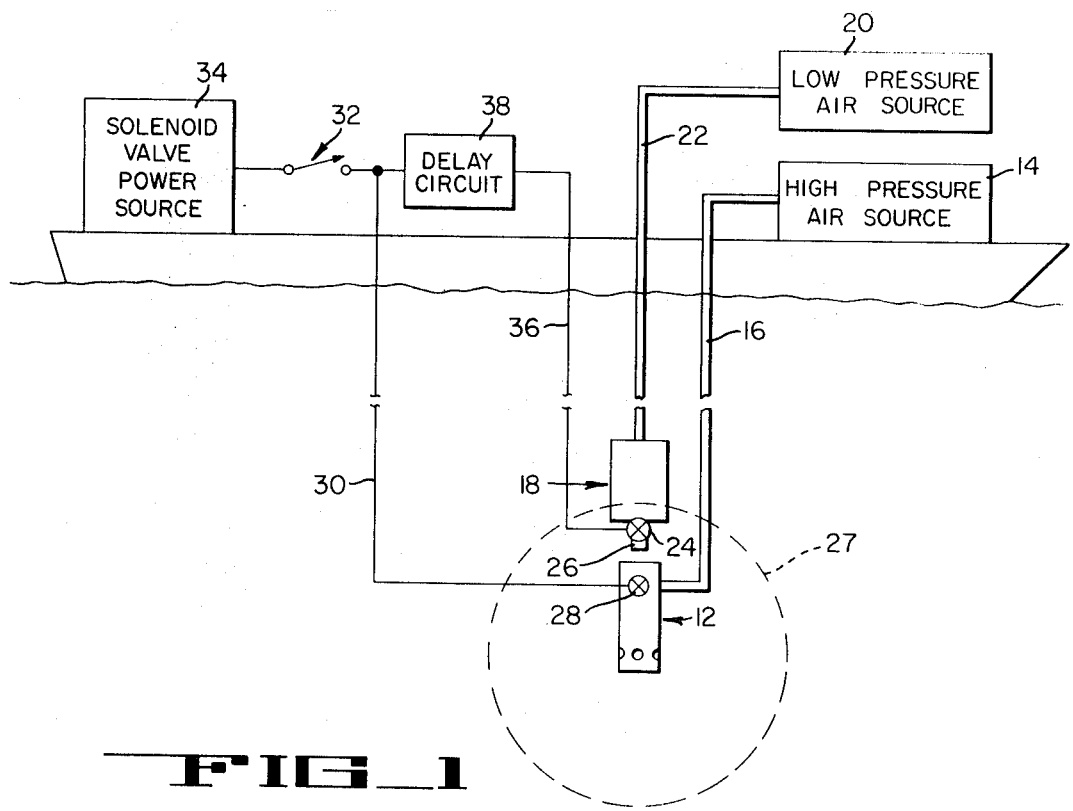
FIG_1
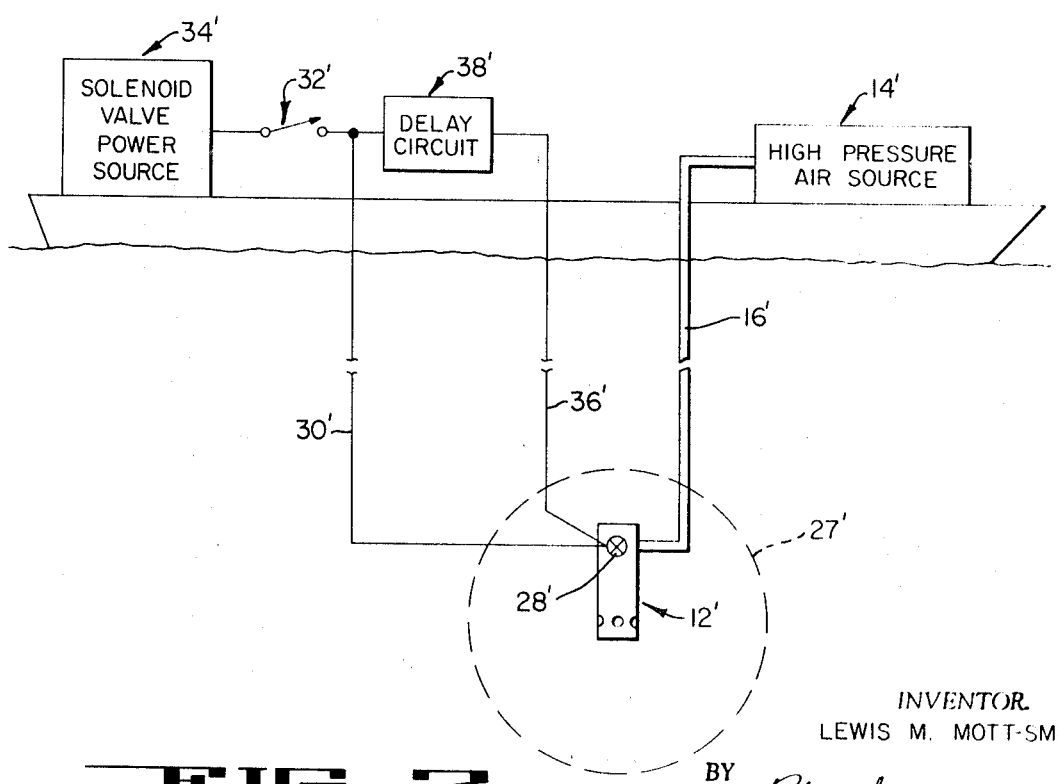
FIG_2
INVENTOR.
LEWIS M. MOTT-SMITH
BY Robert G. Clay
ATTORNEY

SYSTEM FOR SUPPRESSING MULTIPLE PULSE IN MARINE SEISMIC SOURCES BY INJECTION OF ADDITIONAL AIR

BACKGROUND OF THE INVENTION

In underwater seismic exploration systems, seismic signals utilized to explore substrata beneath the water are produced by generating a pressure pulse in the water. Typical of such systems are those utilizing dynamite explosions, combustible gas explosions, and the rapid release of compressed air. In these systems, a gas bubble is formed underwater by the explosions or the release of air and the elasticity of the gas coupled to the inertial mass of the surrounding water forms an oscillatory system. The bubble will grow and shrink at its natural period until the energy dissipates because the viscosity of the water and the radiated acoustic energy gradually brings the bubble to its equilibrium volume as determined by the quantity of gas in the bubble and the ambient hydrostatic pressure of the water. The oscillations which occur after the initial expansion of the bubble are undesirable because at each contraction an additional seismic signal is generated, whereas a single seismic pulse is desired. That is, if a series of uncontrolled seismic pulses are generated, an associated series of echos result from each of the layers of the formation, where echos from layers due to secondary pulses may overlap and thus disguise the echos generated by the initial and desirable primary pulse of the seismic signal.

Typical of existing methods for suppressing bubble oscillation is, for the case of explosives, firing the charge near enough to the surface so that the bubble breaks the surface to thus dissipate the bubble before secondary pulses are generated. Other methods used are to surround the charge with a perforated enclosure to attenuate the secondary oscillations, or to direct gas from the water surface into the bubble which is formed by the seismic source to reduce the contraction of the bubble and thus reduce the amplitude of the undesirable secondary pulses. The first method is that used in conventional seismic marine operations using explosives. The second method is described in U.S. Pat. No. 2,877,859 to W. C. Knudsen and utilizes explosives. The third method is described in U.S. Pat. No. 3,292,140 to F. A. Angona et al. and provides a conduit for introducing gas into the bubble, wherein however, the source of the gas is located at the surface and must be pumped from the surface to the bubble through a relatively long pipe, which requires an excessively large gas pipe in order to provide a sufficiently rapid quantity of gas to suppress bubble contraction.

The above seismic systems which utilize dynamite or combustible gases have various inherent disadvantages. For example, dynamite is cumbersome to utilize, is expensive, is dangerous to handle and accordingly must be handled in accordance with various regulations. Combustible gases also require an extensive amount of equipment for handling the constituents being used, is also expensive to use, and is likewise dangerous to handle. Furthermore, air sources utilize diesel engines and thus require only diesel fuel for operation, which is much more readily obtained than is dynamite or combustible gases.

Although shooting near the surface to allow the bubble to vent to the surface is an effective method of suppressing secondary pulses, the effective strength of the primary pulse is much less than that obtained with an equally powerful sources shot at greater depth. This is so for two reasons. First, the effective downgoing pulse consists of the primary pulse plus the pulse reflected from the water surface. Because of the phase reversal of a reflected acoustic signal at the water-air interface, the reflected pulse tends to oppose the primary pulse and thus to reduce the effective amplitude. It is evident that this effect is greater at shallow depth. If the source is placed at a depth of 30 to 40 feet the peak acoustic pressure generated by the source is increased by a factor of three or more relative to a source at 6 feet. Second, the acoustic pressure produced by a source is proportioned to the compression produced in water. At the surface no compression is possible because of lack of a reaction mass, so that a source near the surface can be expected to be weaker than one at a depth sufficient to make this effect negligible. A depth of 30 to 40 feet is sufficient for sources of the strength required for seismic prospecting.

Accordingly, a further method of suppressing bubble oscillation makes use of a principle of suppression analogous to that of a bubble breaking the surface, but is adapted for use at any depth. The basic idea is to provide apparatus for introducing air into the bubble, about the time that it reaches its maximum radius. It will be evident that addition of air can reduce or eliminate the pressure differential which causes the contraction, and therefore reduce or arrest the bubble pulsations. Ideally it would be desirable to bring the bubble to rest with no further oscillations. However, a partial suppression would in most cases be sufficient.

The quantity, pressure and flow rates of air required for satisfactory damping by this method can be determined by calculation, given the required system parameters such as source characteristics, depth of firing and required degree of damping. However, in order to provide a practical damping method, it is necessary that the required quantity of air and rates of flow can be obtained at reasonable cost.

SUMMARY OF THE INVENTION

The present invention provides an improved underwater seismic source, which in a preferred embodiment utilizes a fast-acting air valve source in conjunction with an adjacent source of suppressor air such as provided by a suppressor air tank disposed in the immediate region of the valve source. The release of air from the air valve source creates an expanding bubble, which upon reaching maximum size may encompass the air tank. When the bubble expands to maximum diameter, the suppressor air tank is suddenly opened to rapidly release a preselected quantity of air into the bubble to decrease the rate of contraction of the bubble and thus suppress the formation of secondary pulses by the seismic source. In another embodiment the suppressor air tank is omitted and the air valve source itself introduces a second burst of air into the bubble as it approaches its maximum diameter, wherein the air valve means itself thus defines the source of suppressor air. In the apparatus of FIG. 1, the air tank 18 and air valve means 12 define in essence an air ejector means, whereas in the apparatus of FIG. 2 the air valve means 12' defines the air ejector means.

The present invention provides advantages over either the dynamite explosion source or the combustible gas source in that there is no need for special precautions in handling the operating medium, and only compressed air apparatus is required to supply the air valve and the suppressor air tank with compressed air. In addition, the invention provides an improved source over that described in the above mentioned U.S. Pat. 3,292,140 in that the suppressor air source is located within the bubble itself and is not supplied via a long conduit from the surface of the water. Accordingly, in the invention apparatus a large quantity of air is supplied in a very short time without need for an exorbitantly large air conduit. In addition, in the preferred embodiment the compressor which supplies the suppressor air tank with air is a low-pressure device which accordingly requires a relatively smaller compressor than does the high-pressure air valve source, or smaller than the source which would be required if the tank was not located underwater near the air valve source.

To this end, by way of example only, a bubble formed by a 300 cubic inch, 2,000 lbs./square inch air valve source fired at a depth of 30 feet, provides a bubble with a maximum volume of 23 cubic feet. Since the bubble oscillation period is approximately 100 milliseconds, the amount of air necessary to sufficiently attenuate the first contraction must be introduced within the bubble in less than this amount of time, or for example, preferably 50 milliseconds. It is found that approximately 9 cubic feet of air under standard conditions is required. It follows that an air flow of 10,800 cubic feet/minute would be required to provide the air, which is a large flow and would require high-pressure differences or an impractically large pipe, or both, if supplied from the surface during ejection as in prior art devices. In addition, the flow would be required to be more or less continuous because of the appreciable time required to establish flow in a long pipe after opening a valve at the surface. Use of the suppressor air tank within the bubble itself as in accordance with the invention facilitates the rapid introduction of air into the bubble without requiring an extremely large air supply or a large pipe leading from the surface. By way of example only, the high-pressure air source utilizes a 100 horsepower prime mover, and the low pressure air source utilizes a 10 horsepower prime mover and delivers 150 lbs./square inch.

BRIEF DESCRIPTION OF THE DRAWINGS

FIG. 1 is a schematic block diagram of an improved air-operated seismic source in accordance with the invention.

FIG. 2 is a schematic block diagram of an alternative embodiment of the invention.

DESCRIPTION OF THE PREFERRED EMBODIMENT

The present invention provides a method and apparatus for reducing the first and subsequent contractions of a generated bubble to the point where the seismic output therefrom becomes acceptably small relative to the output of the initial pulse. Thus the present invention arrests or at least reduces the vigor with which the bubble contracts by providing apparatus within the expanded bubble for introducing air directly therein.

Accordingly referring to FIG. 1, there is shown an improved air-operated seismic source comprising air valve means 12, supported a selected depth underwater as, for example, on a towing cable or to a rigid support which in turn is secured to a ship or barge. An air source 14 disposed on the ship or barge supplies high-pressure air to the air valve means 12, via a conduit 16. A suppressor air tank 18 is rigidly supported preferably by a framework or bracket (not shown) extending from the air valve means 12. An air source 20 is coupled to the suppressor air tank 18 via a pipe 22 to provide a supply of low-pressure air to the air tank. The suppressor air tank is provided with a solenoid valve 24 having a relatively large output aperture 26, to allow the rapid release of a large quantity of air from the tank. As may be seen from the drawing, the suppressor air tank 18 is supported close enough to the air valve 12 to allow at least the aperture 26 thereof to protrude within the air bubble (indicated at 27) at such time as the bubble approaches its maximum size. The maximum size of the bubble is dependent, of course, upon the amount of air released into the water the capacity of the air valve means 12) and the depth underwater of the air valve means 12.

The air valve means 12 includes a trigger solenoid valve 28 which is electrically energized, via an electrical line 30 and switch means 32, by an electrical, solenoid valve power source 34 disposed on the ship or barge. The solenoid valve 24 of suppressor air tank 18 is connected to the air valve side of the switch means 32 via an electrical line 36 and a delay circuit 38. Accordingly, in operation, at such time as a seismic signal is desired, the switch means 32 is closed which immediately energizes the solenoid valve 28 to release a burst of air from the air valve means 12. After a selected time delay commensurate with the time it takes the air bubble 27 to approach maximum size, the solenoid valve 24 is energized via the delay circuit 38 and line 36, to rapidly release the preselected amount of air contained in the suppressor air tank 18 into the bubble 27 in accordance with the invention.

Referring to FIG. 2 there is shown an alternative embodiment performing the function of introducing suppressor air into the bubble from apparatus located beneath the water surface. The embodiment does not require use of the low pressure air source 20, or the suppressor air tank 18. Accordingly, an air valve means 12' is coupled to a high-pressure air source 14' via a conduit 16'. A solenoid valve 28' on the air valve means 12' is coupled to an electrical power source 34' via a line 30' and switch means 32'. In operation, the switch means 32' is closed, temporarily activating the the solenoid valve 28' to release a sudden burst of air from the air valve means 12' and form a rapidly expanding air bubble. At such time as the bubble approaches its maximum diameter, a delay circuit 38' herein depicted in simplified block form, supplies a second trigger pulse to the solenoid valve 28' via line 36' whereby a second burst of air is introduced into the bubble to reduce the contraction thereof in the manner of the air tank 18.

Although the present invention has been described with respect to several embodiments, it is to be understood that various modifications may be made thereto within the spirit of the invention. For example, the suppressor air tank 18 may be situated at any position about the air valve means 12, as long as the outlet aperture 26 is in communication with the interior of the bubble at its maximum expansion. In addition, various electrical circuits could be used in place of the circuits shown in the Figures to effect triggering of the air valve means 12 or 12' and the air tank 18. The electrical circuits may even be replaced by a hydraulic or air-actuated trigger system. Further, several of the seismic sources of the invention might be utilized together and supplied by a single compressor, etc.

I claim:

1. An air-operated seismic source for forming an air bubble underwater to thus generate a desirable seismic pulse caused by the initial expansion of the bubble, while suppressing undesirable secondary pulses caused by the first and subsequent contractions of the bubble, comprising the combination of;

air source means disposed above the surface of the water, said air source means including at least one compressed air source for supplying air at a pressure of the order of 2,000 pounds per square inch;

air ejector means including an air valve means disposed at a selected depth beneath the water surface and containing confined air at substantially said pressure, said air ejector means being coupled to said air source means and adapted to introduce a first burst to air into the surrounding water to define the initially expanding bubble;

said air ejector means containing a second quantity of air under selected pressure beneath the water surface and being further adapted to introduce the second quantity of air directly from the position under the surface of the water into the expanding bubble as it approaches its maximum diameter; and trigger means including a signal time delay means coupled to the air ejector means to operate the air ejector means in selected timed sequence to provide the first burst and the second quantity of air directly from the air ejector means into the water.

2. The seismic source of claim 1 wherein said air source means further includes second air source disposed above the surface of the water, wherein said second air source means supplies air at a pressure of the order of 150 pounds per square inch; and said air ejector means further includes a suppressor air tank for containing said second quantity of air at the second pressure and disposed at the position beneath the water surface and coupled to said second air source means, said suppressor air tank including an outlet aperture disposed adjacent to the air valve means beneath the water surface to allow the air bubble to encompass the outlet aperture as the bubble expands, and a solenoid air valve integral with the outlet aperture of said suppressor air tank and adapted to vent the second quantity of air directly from the position beneath the water surface and into the air bubble in response to a signal from said signal time delay means.

3. The seismic source of claim 1 wherein said trigger means includes initial signal generating means coupled to the air valve means for initiating the release of the first air burst from the air valve means to the water to define the initially expanding bubble, said signal time delay means subsequently initiating operation of said air valve means in said selected timed sequence in response to the initial signal to release the second quantity of air directly from said air valve means beneath the water surface into the expanding bubble.

4. A method for forming a desirable seismic pulse caused by the initial expansion of an air bubble while suppressing undesirable secondary pulses caused by the first and subsequent contractions of the bubble under water, comprising the steps of:

compressing a single quantity of air at a relatively high pressure of the order of 2,000 pounds per square inch;

confining the high-pressure air in a single air ejection device disposed at a selected depth beneath the water surface;

ejecting an amount of the confined air at the selected depth from said single air ejection device to provide the initially expanding air bubble; and subsequently ejecting in timed sequence another amount of the confined air from the single air ejection device directly into the expanding bubble as it approaches its maximum diameter, to thus reduce said contractions.

5. A method for forming a desirable seismic pulse caused by the initial expansion of an air bubble while suppressing undesirable secondary pulses caused by the first and subsequent contractions of the bubble under water, comprising the steps of;

compressing a first quantity of air at a relatively high pressure of the order of 2,000 pounds per square inch, and a second quantity of air at a relatively low pressure of the order of 150 pounds per square inch;

confining the high and low-pressure air respective air ejection devices disposed at a selected depth beneath the water surface;

ejecting an amount of the confined high-puressure air at the selected depth to provide the initially expanding air bubble; and subsequently ejecting in timed sequence the confined low-pressure air directly into the expanding bubble as it approaches its maximum diameter, to thus reduce said contractions.